(12) United States Patent
Pfanstiehl

(10) Patent No.: US 8,330,584 B1
(45) Date of Patent: Dec. 11, 2012

(54) REMOTE CONTROL WITH LOCKABLE KEYS

(76) Inventor: John Pfanstiehl, Indian Rocks Beach, FL (US)

( * ) Notice: Subject to any disclaimer, the term of this patent is extended or adjusted under 35 U.S.C. 154(b) by 692 days.

(21) Appl. No.: 12/504,316

(22) Filed: Jul. 16, 2009

(51) Int. Cl.
*H04N 5/44* (2011.01)

(52) U.S. Cl. ....... 340/12.23; 341/176; 341/23; 348/734; 200/43.18; 200/43.01; 200/43.11

(58) Field of Classification Search ............... 340/12.23; 341/176, 23; 348/734; 200/43.18, 43.01, 200/43.11
See application file for complete search history.

(56) References Cited

U.S. PATENT DOCUMENTS

| | | |
|---|---|---|
| 3,906,814 A | 9/1975 | Magnussen |
| 4,820,887 A | 4/1989 | Schmitz |
| 4,827,440 A | 5/1989 | Wathor |
| 5,241,583 A | 8/1993 | Martensson |
| 5,290,979 A | 3/1994 | Grass |
| 5,385,417 A | 1/1995 | Wade et al. |
| 5,638,308 A | 6/1997 | Stokes |
| 5,883,680 A | 3/1999 | Nykerk |
| 5,921,381 A | 7/1999 | Von Arx |
| 6,111,518 A * | 8/2000 | Han ............................... 341/176 |
| 6,201,199 B1 | 3/2001 | Chew et al. |
| 6,325,176 B1 * | 12/2001 | Jensen .......................... 187/222 |
| 6,750,802 B1 | 6/2004 | Olen |
| 7,256,726 B2 | 8/2007 | Bejean |
| 2002/0078442 A1 | 6/2002 | Reyes et al. |
| 2004/0203604 A1 | 10/2004 | Pugliese et al. |
| 2004/0249477 A1 * | 12/2004 | Blanpain ......................... 700/17 |
| 2005/0083173 A1 | 4/2005 | Konupek et al. |
| 2006/0075250 A1 * | 4/2006 | Liao ............................... 713/182 |
| 2007/0151008 A1 * | 7/2007 | Hayashi et al. .................. 4/300 |

\* cited by examiner

*Primary Examiner* — Jennifer Mehmood
*Assistant Examiner* — Andrew Bee

(57) ABSTRACT

An inexpensive remote control that provides an easy means to block the function of trouble-prone keys. In one embodiment, the user presses the selected key for a short time to place that key into the locked mode. In another embodiment, the user presses a LOCK key and then presses the selected key to place that key into the locked mode. To change the key back to the unlocked mode, the same process is repeated. A LED can flash when a locked key is pressed to alert the user that the key is locked. Means to automatically lock a preferred set of keys and means to unlock all keys can also be provided. A key's function is blocked by either not sending a signal from the remote or by sending a unique lock code. No changes to components or manufacturing processes of existing remotes or controlled devices are needed.

13 Claims, 7 Drawing Sheets

REMOTE CONTROL WITH LOCKABLE KEYS

FIELD OF THE INVENTION

The present invention relates to electronic devices that are used to wirelessly control other devices from a remote location through transmitting signals such as infrared or RF, for example.

BACKGROUND OF THE INVENTION

Remote control devices, such as the remote controls used to control TV's and stereos are well known. As microprocessors have become more complex, the number of functions offered in electronic devices have also become more complex. To handle the myriad of functions of today's electronic devices, remote controls have also grown increasingly complex. Modern remotes often have fifty or more keys. A common problem with modern remotes is that inadvertently pressing a specialized key can cause a change in function that is at least inconvenient and often is irreparable to the user of the remote. Prior art shows a number of attempts to solve this problem.

U.S. Pat. No. 5,921,381 to Von Arx (1999) describes a selectively lockable button structure that allows for simple and easy mechanical button deactivation and reactivation. The button structure is especially adapted for interface panels of various types of electrical equipment wherein there may be a need for button lockout once the equipment is installed. In one rotational position, the button is depressible (unlocked) while in another rotational position, the button is not depressible (locked). This prior art relates to electrical equipment, not electronic remote controls. Furthermore, it describes individual mechanical lock-out mechanisms for each key. Mechanical lock-outs are not economically feasible for production of modern remote controls which often have no moving parts other than a membrane switch.

The following three patents also describe mechanical solutions to the problem, and therefore, all are also not economically feasible for production of modern remote controls.

U.S. Pat. No. 6,201,199 to Chew et al. (2001) describes a lockable button mechanism for use in a portable device. The mechanism includes three button elements aligned with three switch elements, whereby the button elements may be individually depressed to activate respective switch elements. The mechanism further includes a locking element interposed between the switch elements and the button elements, the locking element being slidably displaceable between a first position in which depression of the button elements is enabled, and a second position in which the locking element blocks depression of the button elements.

U.S. Pat. No. 5,290,979 to Grass (1994) describes a molded, generally planar, U-shaped plastic member that has a pair of lateral projections on one leg and a single lateral projection at a distal end of the other leg. The projections are received in recesses in mutually facing surfaces of a raised escutcheon rib surrounding a handle opening to locate the base of the U-shaped member in the path of the handle, blocking movement of the handle. A notch in the distal end of the leg having the single lateral projection receives a flat-bladed tool which is twistable against the escutcheon rib surface to deflect the leg inward and projection free of the respective recess to release the handle block. The recesses are symmetrically arranged to permit the handle block to be installed to block the handle ON or OFF as desired.

U.S. Pat. No. 3,906,814 to Magnussen (1975) describes a lock mechanism for preventing the accidental depressing of a keyboard key. The mechanism comprises a stem adapted to fit through an aperture in the keyboard mounting plate, a return spring extending between the bottom of the mounting plate and the bottom of the stem for resiliently urging the key stem into a position normal to the mounting plate, and a locking key having on one side surface a latch adapted to fit beneath the edge of the adjacent keyboard key. The latch, therefore, prevents accidental depressing of the key until the operator first releases the locking key.

The following three patents describe rigid covers over keys to lock-out their function. The problem with this solution, in addition to the added mechanical component, is that the user (or the person setting up the system) cannot easily choose which keys are to be locked-out.

U.S. Pat. No. 4,820,887 to Schmitz (1989) discloses a keypad with membrane exhibiting more or less rigid covers overlying the critical buttons of the keypad and making it possible to render an action on them impossible or more difficult. U.S. Pat. No. 5,385,417 to Wade et al. (1995) discloses a rigid cover intended to overlay a button and exhibiting a hole such that this button can be actuated by a pointed object such as the tip of a pen. U.S. Pat. Nos. 3,906,814 to Magnussen (1975) and 5,290,979 to Grass (1994) disclose control devices exhibiting members making it possible to mechanically lock certain buttons so as to prohibit their use.

Several electronic devices have internal or external means to lock-out specific keys on the device itself. For example, some high-end NEC plasma displays are reported to offer the option to disable all of the buttons on the unit, as well as a lockable IR function. The Cybermax FM transmitter can disable keys internally to prevent users from changing settings. The keys on the Smarthome thermostat can be disabled to prevent anyone from controlling the thermostat locally. To disable the keys on the Smarthome thermostat, a wire jumper is soldered across two holes on the circuit board. None of these devices are remote controls that have the ability to lock-out selected individual keys.

Some devices enable all the keys of a remote, or the entire remote function to be disabled. ED Systems provides a feature in their set-up program that enables the installer to disable the remote after making the appropriate settings. The High Definition Component Video Switch by Digital Connection offers a feature that disables all keys on the remote or the IF sensor on their switch. Systems that entirely disable a remote are substantially different in form and function than the present invention.

U.S. Pat. No. 7,256,726 to Bejean (2004) claims a method of disabling the buttons of the keypad of a command transmitter intended to control an appliance for security and/or access control in a building The method comprises repetitions of the following steps: automatic disabling of at least certain buttons of the command transmitter after a command is sent, while specific buttons remain active to send at least a safety command; and cancellation of the disabling of the buttons through a specific action on the command transmitter. The present invention has the ability to lock-out individual keys selected by the user, which Bejean does not disclose.

A number of cell phones have a feature to temporarily lock-out commonly used keys to prevent numbers from being dialed when the phone is in a pocket. For example, the Sanyo RL-4930 Cell Phone has a Key Guard to avoid accidental key presses without blocking incoming calls or messages. Pressing and holding a key marked with a key icon, or going through a menu system enable the key lock feature to be enabled. This differs from the present invention in that it is not a remote control and that it only allows a pre-determined set of keys to be locked.

U.S. Pat. No. 5,241,583 to Martensson (1993) describes a portable radio telephone that has a keypad including a plurality of externally accessible keys. The keys can be disabled (i.e. the keypad can be locked) to prevent accidental actuation thereof by performing a predetermined order of keystrokes using two of the keys which ordinarily have an alternative function associated therewith. Thus, for example, depression of the # key followed by the ON/OFF key temporarily enables the keyboard lock. The lock can be disabled simply by repeating the same keystrokes. This also differs from the present invention in that it is not a remote control and that it only allows a pre-determined set of keys to be locked.

U.S. Pat. No. 5,638,308 to Stokes (1997) discloses a calculator with keys which can selectively be disabled. By holding down a number key or certain of the function keys for a predetermined period of time such as two to four seconds, the user can disable the selected number or function. This allows the calculator to be used effectively in teaching factoring and various mathematical properties and leads the student to innovate in substituting different numbers and functions in solving problems in the student's own way. For discontinuing all key disabling, a reset key preferably is provided. Stokes differs from the present invention in that it is a self-contained unit, not a device used to control a remote device. Also it does not transmit infrared or RF signals and the result of disabling keys is not disabling a RF or infrared signal.

U.S. Pat. No. 4,827,440 to Wathor (1989) describes the method and apparatus for locking out the keys of a personal computer keyboard when their functions are not needed. A lockout routine is addressed which is used to lock out the selected keys. It employs two special added keys: an end lockout key which is provided for indicating that the user wishes to leave the lockout mode and a lockout key. Walthor does not disclose a device that wirelessly controls another device. It also does not transmit infrared or RF signals and the result of disabling keys is not disabling a RF or infrared signal.

U.S. patent application 20040203604 by Pugliese and Pierluigi (2004) describes an electronic device including a keyboard having a plurality of keys with the keyboard having a key lock function that, when activated, locks the keyboard against unintended input operations. The keyboard is apt to be unlocked and at least a portion is unlocked by entering a sequence of intentional key entries. The sequence of intentional key entries allows the keyboard to be unlocked and preferably entering additional keys or operations. This invention employs sequences and specific inputs for blocking keyboard use on cell phones. It does not describe means for locking individual keys. Remotes for some specific applications prefer to limit remote control access to only some instruments on the network. The Simrad IS12 Remote Control/ Alarm can completely turn off the remote input on a particular piece of equipment. The general procedure is as follows: on the instrument enter calibration mode, press keys necessary for the display to show CTRL and press the proper mode. The display will show the current setting—ON for remote control enabled or OFF for remote control disabled. The setting can be changed using certain keys. To set the selected mode, press the required keys. The display will then return to the main calibration menu. This system differs substantially from the present invention. In this system, each individual receiving instrument is programmed to enable remote control or disable remote control.

U.S. Pat. No. 5,883,680 to Nykerk (1999) describes a remote control of a television receiver having a keypad including a time-lock key and another key; means for locking the other key for a time period specified by a user in response to a depression of the time-lock key; and a transmitter for transmitting a channel select signal in response to a depression of the other key when the other key is not locked. In a further embodiment, the remote control device has a keypad including a key; a processor for generating electrical signals in response to a depression of the key; a transmitter for transmitting a transmit signal in response to the electrical signals; a low frequency detector for detecting low frequency soundwaves; and an audio signal generator for emitting an audio signal in response to the low frequency soundwaves U.S. patent application 20020078442 by Reyes et al. (2002) relates to an entertainment system and method for controlling the transmission of control information to an input device in an entertainment system. The system receives programming data associated with a broadcast channel and displays a show associated with the channel. The input device is then configured to operate in a first mode that suspends transmission of input control information entered via said input device, to the entertainment system. The user is guided by a menu that appears on the screen of the receiving device and follows the menu to select many options, including locking out functions of the remote. Unlike the present invention, this invention requires dedicated hardware and programming inside the receiving device and employs multi-step menus.

In the field of the present invention are remotes with various learning functions. For example, the ATLAS OCAP 5-Device remote enables certain keys to be programmed to a new function. The user holds a different remote up to the Atlas remote after entering a mode, and the Atlas will read and copy the code. The procedure is complicated, requiring more than five steps and key presses. Furthermore, it only changes the signal being sent from the remote, it does not disable the key.

Another remote in the field of the present invention is the Sony RM-AV2000 which has a large LCD touch screen display. It has a feature to disable all the keys and another feature to disable any changes in the set-up of the remote. It also has a feature that enables certain icons on the touch screen to be hidden. The description of the procedure is as follows: " . . . while pressing the RESET key, press the key you want to hide (flashing). The pressed key changes to slower flashing and will no longer be displayed during remote control operations. To display it again, perform the same procedure again." This remote has a touch screen display and therefore is much more complex and expensive than a standard remote and it only enables on-screen icons to be hidden, it does not disclose disabling of the conventional keys.

U.S. Pat. No. 6,750,802 to Olen (2004) describes a remote primarily intended for use by young children. A method of programming a favorite channel key is described. The production model of the remote shown in the patent, the Weemote, additionally uses a special code to lock or disable a specific set of buttons: the volume and the channel buttons. On the Weemote 2, to disable the volume keys, the user presses and holds the TV button for three seconds until the LED begins to blink. The user then needs to press the FAV button once and then press the "10" button. The LED then blinks three times. To disable the channel keys, the user presses and holds the TV button for three seconds until the led begins to blink. The user then needs to press the FAV button once and then press the "1" button. The 10 and the 1 button are located under a cover on the bottom of the remote, inaccessible to the child.

U.S. patent application 20050083173 by Konupek et al. (2005) describes pressing two specific keys, optionally marked lock/unlock, to lock the entire key pad (user interface) of a remote. The purpose of Konupek is to enable the owner to lock the remote's entire keypad whenever the owner is not using it, and to unlock the remote when the owner wants to use it. Therefore the function of Konupek is to lock and unlock the keypad frequently so that when it's not being used by the owner, the remote does nothing at all. The purpose of the present invention is for a one-time, simple programming of the remote to prevent inadvertent changing of rarely-used settings (zoom, picture size, sound field, etc.) that may be difficult for some users to reverse. The remote can still be used for all common functions at all times.

The last type of remote in the field of the present invention described here is exemplified by the Atlas DVR Digital Remote-Bright House. It has a Programming Channel Control Lock. By default, the remote control's channel-control capabilities are locked to the Digital SmartBox. The affected keys are 0-9, CH+, CH−, ENTER, and LAST. This guarantees that the user does not inadvertently change a channel on their TV or VCR. The feature can be de-activated to allow full access to these keys in the TV and VCR modes. To Unlock Channel Control, the user, on the remote control, presses CBL once; it will blink once. Then they press and hold SETUP until the CBL key blinks twice, then they release SETUP. Next they enter 9-7-3. The CBL key will blink twice. Then they press CH−once. The CBL key will blink four times. Although very desirable for its particular application, this system is fundamentally different than the present invention in the following ways. The Atlas remote still sends out a signal when the key is pressed, it only affects which device the remote controls. The Atlas remote only allows this change for commonly used keys. And the Atlas remote requires a special code sequence and a complicated procedure to make the change.

Inexpensive remote controls are typically comprised of an injection-molded plastic enclosure, a microprocessor with programming, a memory, a keypad, a transmitter and a source of energy such as a battery. None of the prior art discloses an inexpensive remote control that enables the user to easily lock-out the function of user-selected, individual keys. This prevents inadvertent changing of modes or settings that can be caused by user errors in key pressing, a child handling the remote, a pet walking or laying on the remote, dropping the remote, or placing something on top of the remote.

SUMMARY OF THE INVENTION

The object of the present invention is to eliminate a common problem of remotes, specifically the inadvertent sending of undesirable control commands to the controlled device. The present invention allows the user or installer to lock out the function of individual keys on the remote.

Another object of the present invention is to provide a very simple or intuitive means to lock and unlock individual keys on a remote.

Another object of the present invention is to provide a very inexpensive-to-manufacture means to lock and unlock individual keys on a remote.

Another object of the present invention is to provide a means to lock and unlock individual keys on a remote that requires no modification of the controlled devices, such as TV or stereos. Therefore, the remote of the present invention can be used with existing products without modifications or changes to the products controlled by the remote.

Another object of the present invention is to provide a means to lock and unlock individual keys that requires little or no modifications to existing remote designs, components, manufacturing and hardware.

Another object of one embodiment of the present invention is to provide a means to effectively lock and unlock the function on a controlled device of a remote's individual keys that requires no modifications to the existing remote. It further enables the function of those keys to be remained locked or unlocked if other remotes are used on the controlled device.

The present invention provides an easy, defined procedure to lock or block the function of unnecessary or undesirable keys on remote controls. In one embodiment, the user simply presses the selected key for a short time, for example three seconds, to place that key into the locked mode. In another embodiment, the user presses a LOCK key and then presses the selected key to place that key into the locked mode. To change the key back to the unlocked mode, the same process is repeated. The above operations are programmed into the remote's microprocessor and the mode state for each individual key is stored in the remote's memory. In practice, the memory is typically in the microprocessor or on the microprocessor's printed circuit board. However, for clarity of description, the memory is described as a separate component. The mode can be set by a single byte of memory, or flag, where one value flags the individual key as locked and another value identifies it as unlocked.

Optionally, when a locked key is pressed, a LED can flash or text or an icon on a display can alert the user that they key is locked. No changes to the programming or hardware in any controlled device such as a TV or stereo are needed.

A third embodiment uses the microprocessor and memory in the controlled device to functionally lock and unlock individual remote keys and therefore requires no modifications to the remote.

BRIEF DESCRIPTION OF THE DRAWING

For a fuller understanding of the nature and the objects of the invention, reference should be made to the following detailed description, taken with the accompanying drawings, in which.

DETAILED DESCRIPTION

Figure 1:
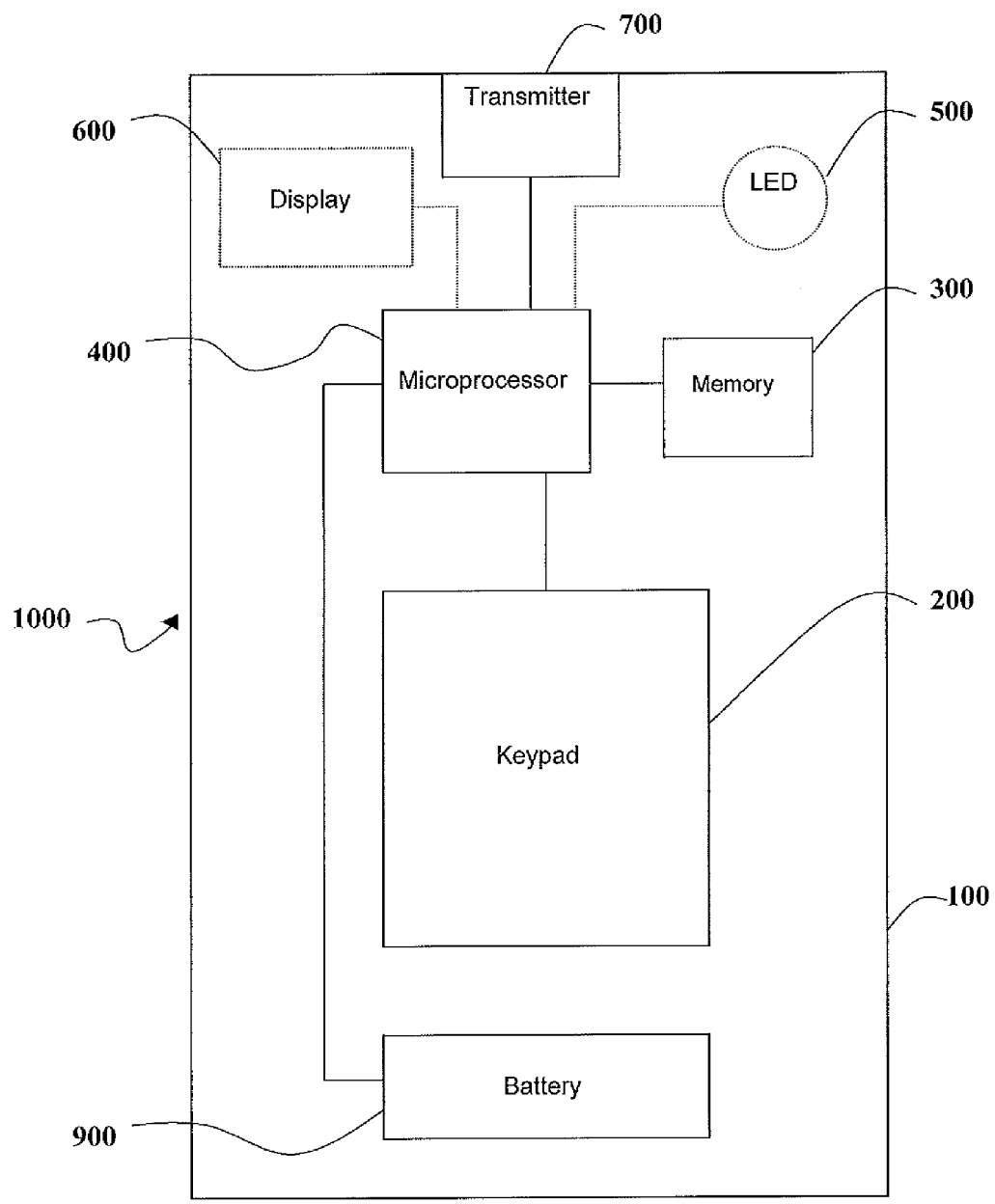
FIG. 1 is a schematic diagram illustrating the components of a first embodiment and a second embodiment.

FIG. 1 illustrates components of a first embodiment and a second embodiment of the present invention in portable remote control device 1000. Enclosure 100 includes keypad 200, microprocessor 400, memory 300, transmitter 700 and battery 900. Optional components are LED 500 and display 600. The keypad 200 includes a plurality of individual keys.

In a first embodiment, a user simply holds down a selected individual key for a predetermined period of time in a defined range, for example two to five seconds, to place that key into the locked mode. To change the key back to the unlocked mode, the same process is repeated: the user presses the selected key for a period of time in a defined range.

Figure 2:
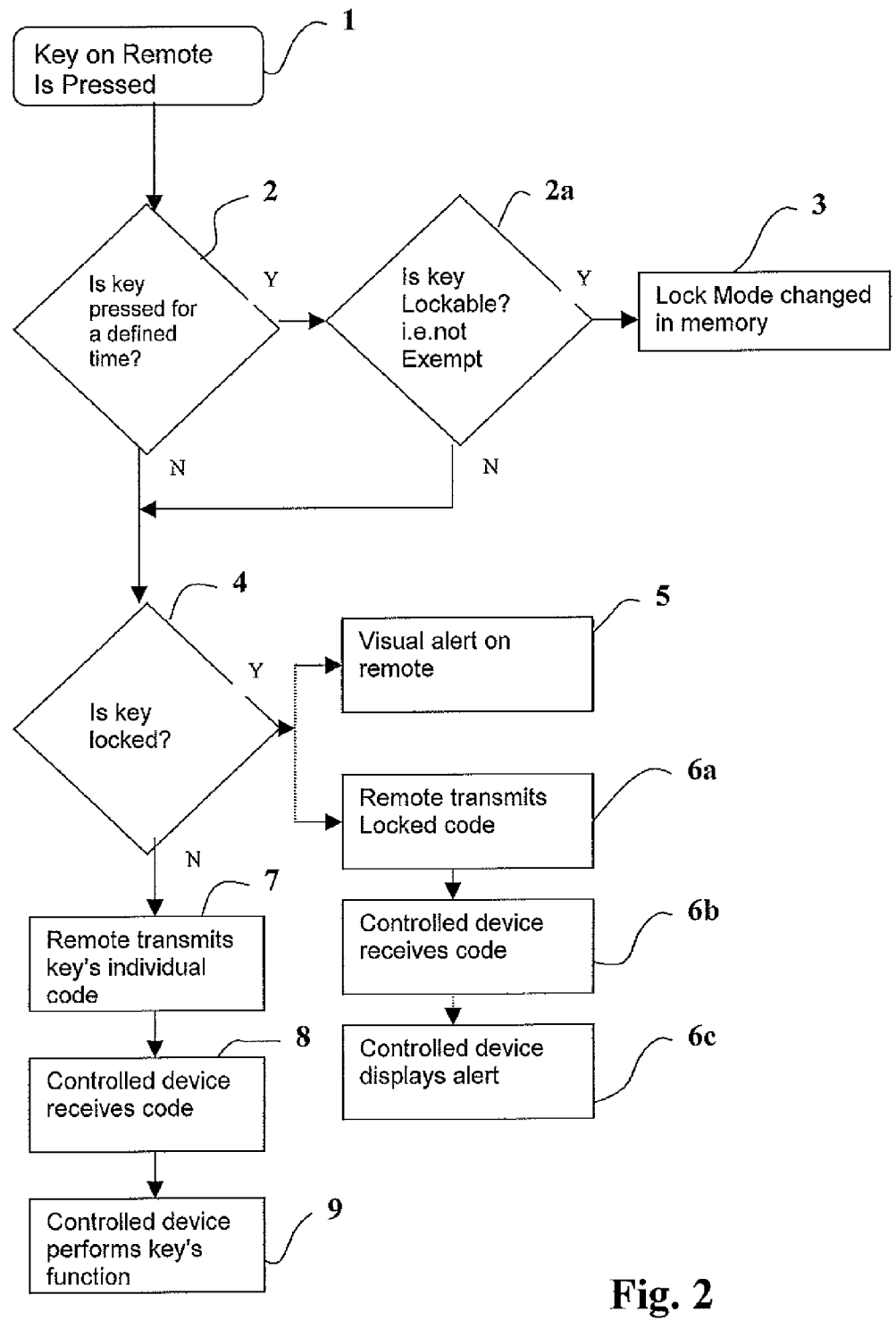
FIG. 2 is a schematic flow diagram showing operation of the first embodiment.

FIG. 2 illustrates the sequence of primary operations after an individual key is pressed (1). The microprocessor receives a signal from the individual key and determines if it is held down for the period of time in a defined range (2). If Yes, the microprocessor determines if the individual key is Lockable (2a). The microprocessor can be programmed so that certain keys are exempt and cannot be locked. Examples of these can be the Power, Volume, or Channel keys. If the result is Yes (the key is Lockable), the microprocessor changes the mode or flag in memory for that individual key (3), and the key is locked.

If 2 is No, the microprocessor then reads the memory to determine if that individual key is flagged as locked (4). If Yes (that individual key is flagged as locked), optionally the microprocessor can display an alert to the user that the key is locked (5). An alternative option is that the microprocessor cart transmit a Locked code (6a) which can be received by the controlled device (6b) which then displays a visual alert (6c).

If 4 is No (that individual key is not flagged as locked), the individual key's code is transmitted (7), the code is received by the controlled device (8) and the key's function is performed (9).

In a second embodiment, to place an individual key into the locked mode, the user presses a specified different individual key, herein called the LOCK key, and then presses the selected individual key. To change the key back to the unlocked mode, the same process is repeated: the user presses the LOCK key and then presses the selected individual key. The LOCK key does not have to be a single function key, it can perform two functions and thereby no additional keys are needed. The LOCK key can be identified by text or icon. Alternatively, in place of a LOCK key, remotes that have a display can employ a "Lock" mode from their menu. The user scrolls to the lock mode and then presses the individual keys that are to be locked.

Figure 3:
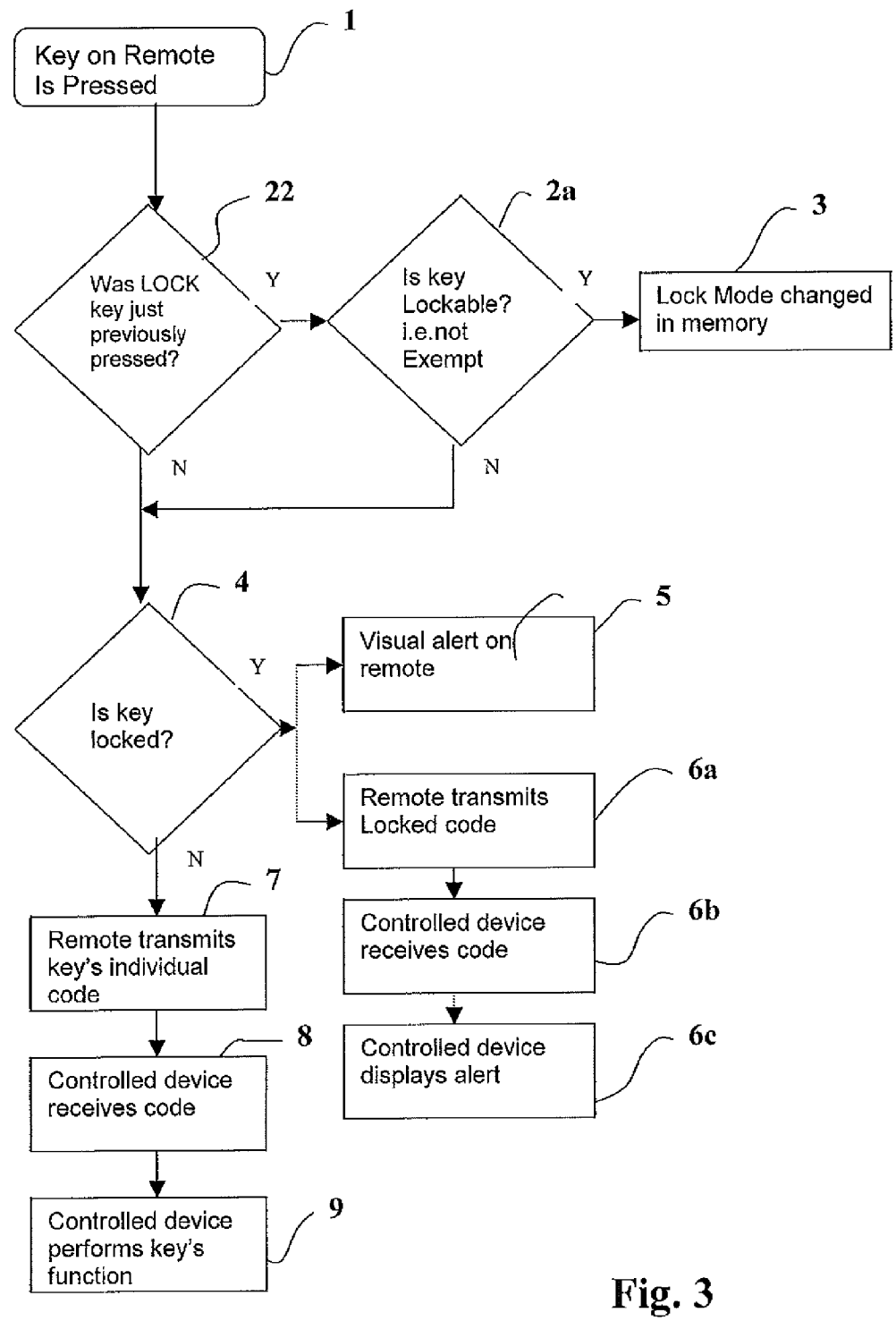
FIG. 3 is a schematic flow diagram showing operation of the second embodiment.

FIG. 3 illustrates the sequence of primary operations in the second embodiment after an individual key is pressed (1). The microprocessor receives the signal from the individual key and determines if the LOCK key was previously pressed within a specified period of time, for example within two seconds (22). If Yes, the microprocessor determines if the individual key is Lockable (2a). If the result is Yes (the key is Lockable), the microprocessor changes the mode or flag in memory for that individual key (3) and the key is locked.

The following subsequent processes are identical to those described in the first embodiment. If 22 is No, the microprocessor then reads the memory to determine if that individual key is flagged as locked (4). If Yes (that individual key is flagged as locked), optionally the microprocessor can display an alert to the user that the key is locked (5). As alternative option, the microprocessor can transmit a locked code (6a) which can be received by the controlled device (6b) which then displays a visual alert (6c). If 4 is No (that individual key is not flagged as locked), the individual key's code is transmitted (7), the code is received by the controlled device (8) and the key's function is performed (9).

Therefore, in both the first and second embodiments, when a key in the locked mode is pressed, its function is disabled by either not sending a signal from the remote (i.e. not proceeding to 7) or by sending a locked code (6a). In both the first and second embodiments, the disabling of the function of a key is accomplished by programming inside the remote that suppresses that key's unique code signal when that key is pushed. This means the controlled device (TV, stereo/amplifier, cable box, etc.) requires no modifications.

As illustrated in FIG. 2 and FIG. 3, a visual alert on the remote (5) can tell the user when a locked key is pressed. On either the first or second embodiment, the visual alert can be a LED that illuminates or flashes. The LED can be identified as LOCKED with text or an icon. Alternately, remotes that have LED or other lamps can alert the user that a pressed key is locked by flashing or by illuminating in a sequence any or all of the lights. Remotes that have a display can display text or an icon, flashing or continuously, to alert the user that the pressed key is locked.

For either the first or second embodiment, if the controlled device (TV, DVR, DVD player, cable box etc.) has programming that recognizes the Locked code received from the remote (613), the controlled device can display information to alert the user, for example "This key is Locked. To Unlock, press the LOCK key and this key" (6c). The alert also can be an audio alert such as a beeping sound.

Figure 4:
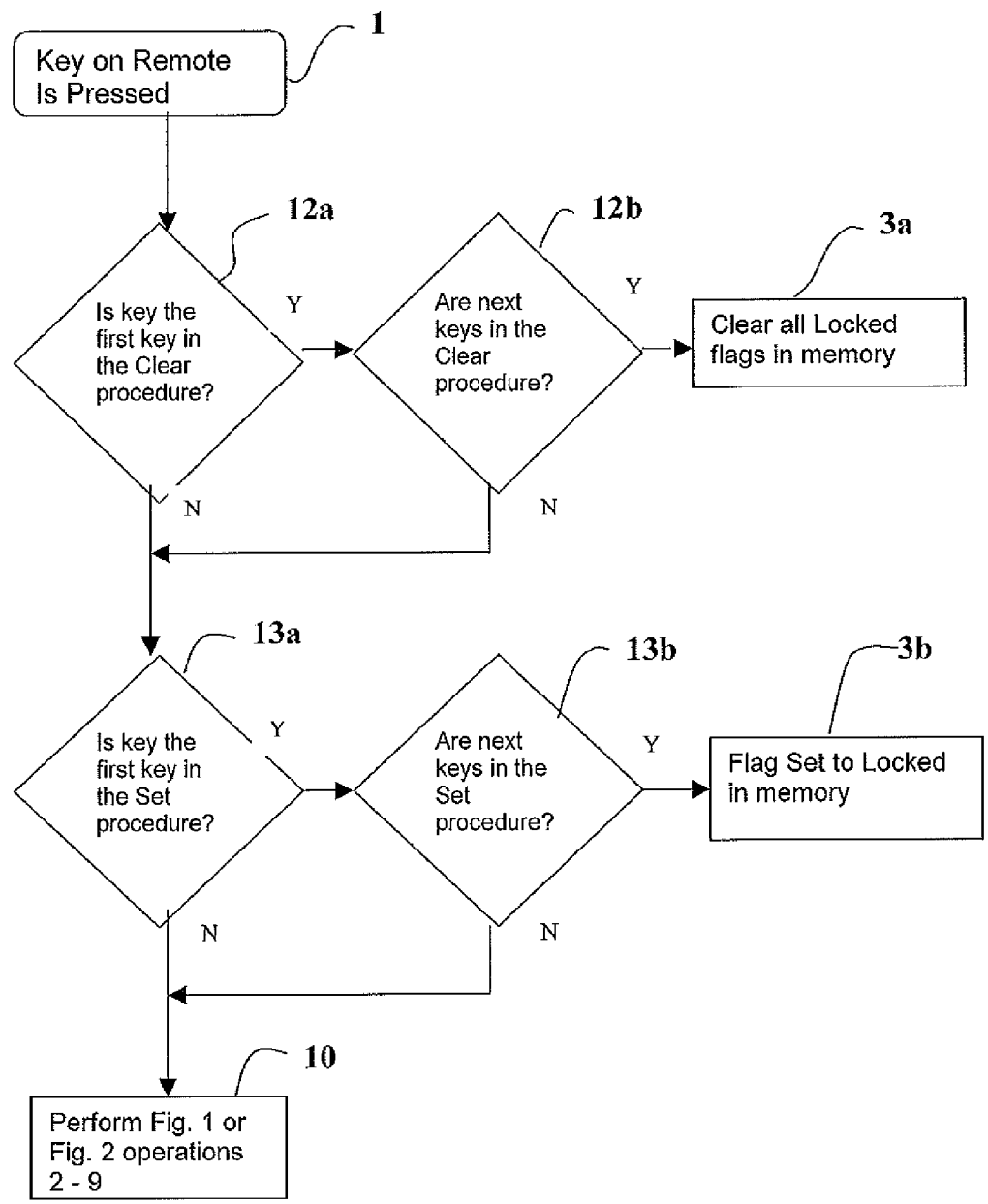
FIG. 4 is a schematic flow diagram showing operation of optional features of the first and the second embodiment.

Optionally, in both the first and second embodiment, the remote can have a simple procedure to clear all the locked flags from memory and thereby enable all the keys on the remote to quickly change to the unlocked mode. The Clear procedure can be pressing a particular sequence of keys or pressing two specified keys simultaneously. FIG. 4. illustrates how the Clear procedure and another optional Set procedure, described below, can be inserted into the previously described flow charts. After a key is pressed (1), the microprocessor determines if the key is the first in the Clear procedure (12a). If Yes, the microprocessor determines if the next keys pressed are in the Clear procedure (12b). If Yes, all the Locked flags are cleared in the memory (3a). If either 12a or 12b are No, the process advances to the next operation.

Figure 5:
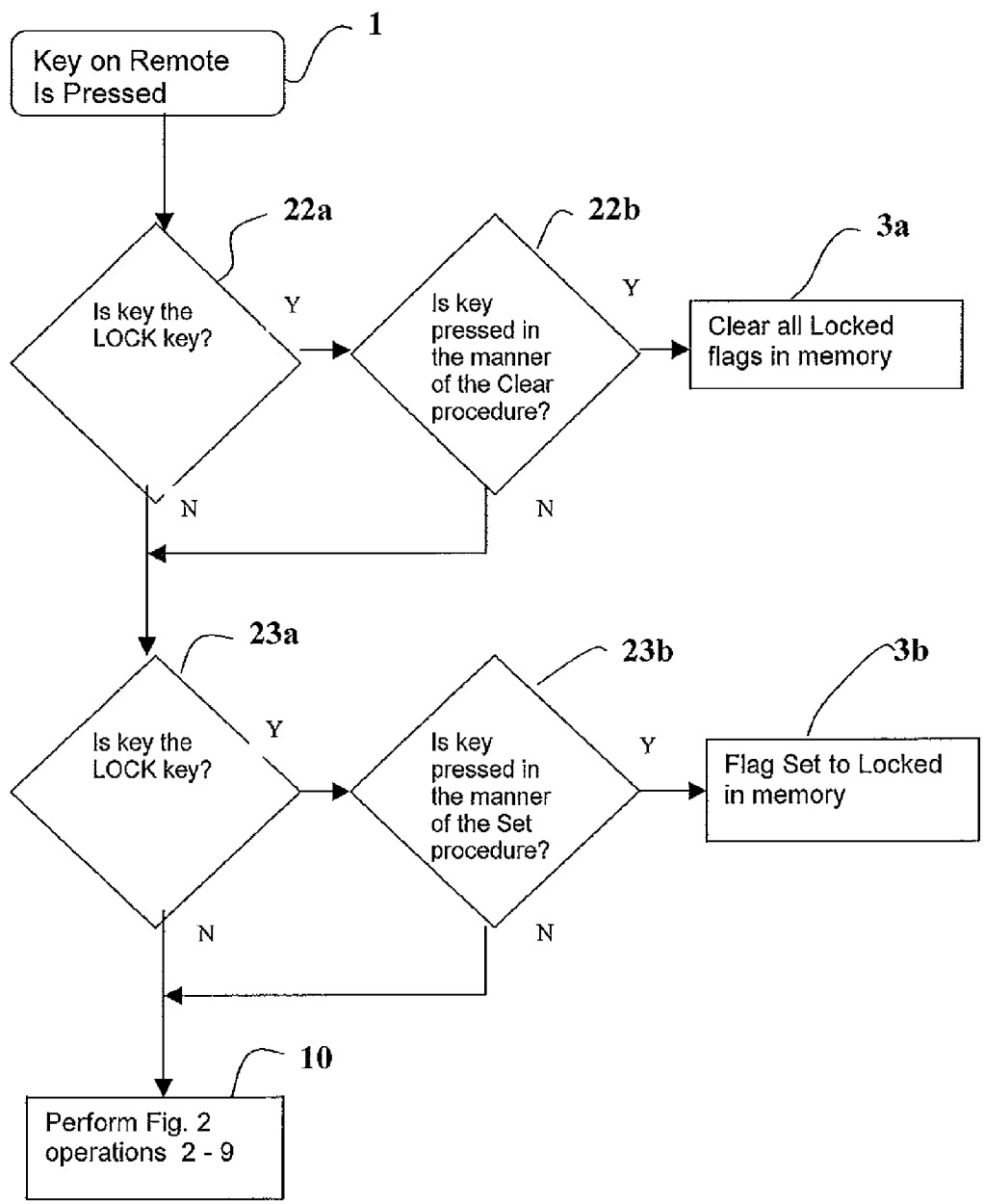
FIG. 5 is a schematic flow diagram showing operation of optional features of the second embodiment.

In the second embodiment, the Clear procedure can alternatively be pressing the LOCK key for a specific range of time or pressing the LOCK key a specific number of times. FIG. 5 also illustrates how the Clear procedure and another optional Set procedure, described below, can be inserted into the previously described flow charts. After a key is pressed (1), the microprocessor determines if the key is the LOCK key (22a). If Yes, the microprocessor determines if key is pressed in the manner of the Clear procedure (22b). If Yes, all the Locked flags are cleared in the memory (3a). If either 22a or 22b are No, the process advances to the next operation.

For clarity in description, both FIG. 4 and FIG. 5 group the optional processes, Set and Clear, together. However either can be executed without the other. Although the Set process is illustrated as executed after the Clear process, the Set process can be executed first.

As an additional option in both the first and second embodiment, the remote can change a predetermined set of individual keys to the locked mode. The Set procedure can be pressing a particular sequence of keys or pressing two specified keys simultaneously, FIG. 4 illustrates this process. After a key is pressed (1), the microprocessor determines if the key is the first in the Set procedure (13a). If Yes, the microprocessor determines if the next keys pressed are in the Set procedure (13b). If Yes, the predetermined set of individual keys are flagged to the locked mode in the memory (3b). If either 13a or 13b are No, the process advances to the next operations, which are operations 2 through 9 in FIG. 1 (10).

In the second embodiment, the Set procedure alternatively can be pressing the LOCK key for a specific range of time or by pressing the LOCK key a specific number of times. FIG. 5 illustrates the process. After a key is pressed (1), the microprocessor determines if the key is the LOCK key (23a). If Yes, the microprocessor determines if key is pressed in the manner of the Set procedure (23b). If Yes, the predetermined set of individual keys are flagged to the locked mode in the memory (3b). If either 23a or 23b are No, the process advances to the next operations, which are operations 2 through 9 in FIG. 2 (10).

The Set procedures enable an installer or owner to quickly and easily lock the most trouble-prone keys. This is particularly important for TV's in hospitals and hotels. By locking trouble-prone keys, such as Source or Picture Mode, employees do not have to be interrupted to help guests return the TV to its normal functioning. In many cases, this same result has been accomplished by the TV manufacturer providing a different remote that has a limited key pad. The ability to easily lock trouble-prone keys provides substantial savings because manufacturers only need to provide one remote and one SKU for both retail and institutional customers.

In all of the embodiments, a label can be attached to the remote to inform the user of the new key locking feature and to provide simple instructions on how to lock and unlock individual keys.

Figure 6:
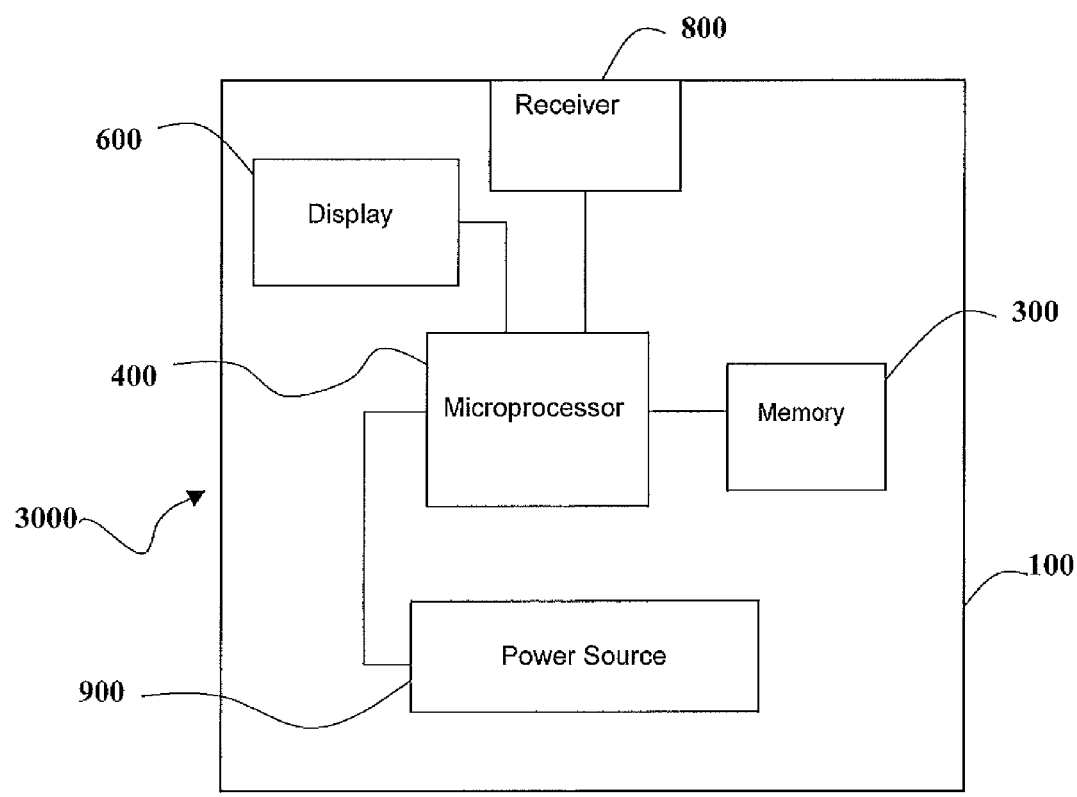
FIG. 6 is a schematic diagram illustrating the components of a controlled device in a third embodiment.

FIG. 6 illustrates the components of a third embodiment of the present invention on a separate controlled electronic device 3000, such as a TV or cable box. Enclosure 100 encloses microprocessor 400, memory 300, display 600, receiver 800 and power source 900.

The third embodiment is a variation on either the first or second embodiment. Instead of using programming and memory inside the remote, the programming and memory inside the controlled device, for example a TV, is used. This is an inexpensive solution because modern TV's and most other electronic devices already have internal microprocessors, programming and memory. The procedure for locking a key can be the same, for example, the user simply holds down the selected key for a period of time in a defined range, for example two to five seconds, to place that key into the locked mode. The optional Clear and Set features can also follow the same procedures as described in either the first or second embodiment.

Figure 7:
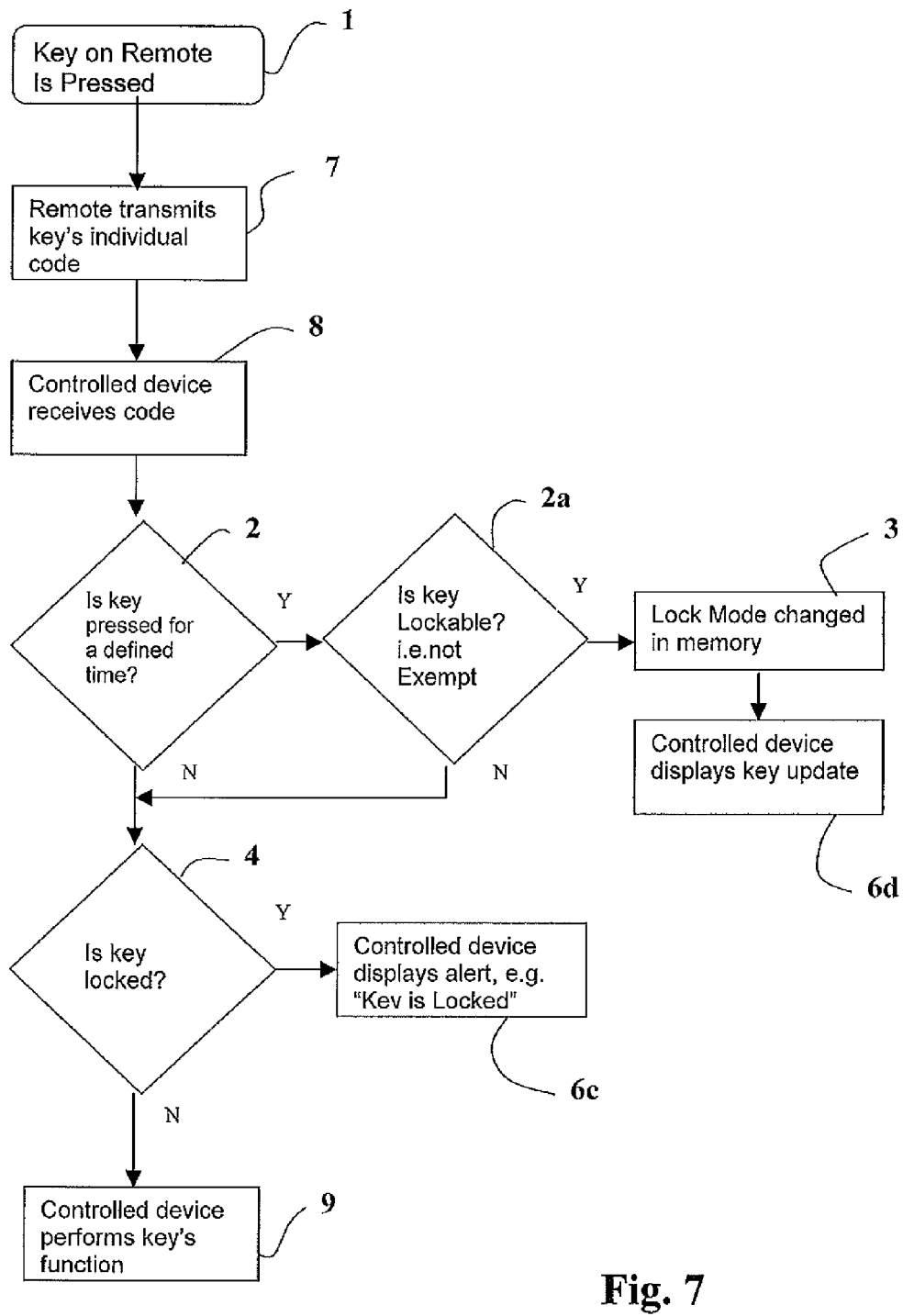
FIG. 7 is a schematic flow diagram showing operation of the third embodiment.

FIG. 7 illustrates the flow chart for the primary processes in the third embodiment. A key is pressed on the remote (1). The remote transmits the key's individual code (7). The controlled device receives the individual code (8). The controlled device's microprocessor determines if the key is held down for the period of time in a defined range (2). If Yes, the microprocessor determines if the individual key is Lockable (2a). If 2a is Yes (the key is Lockable), the microprocessor changes the mode or flag in memory for that individual key (3). The controlled device then displays an update, for example "This key is now Locked" or "This key is now Unlocked" (6d).

If 2 or 2a are No, the microprocessor then reads the memory in the controlled device to determine if that individual key is flagged as locked (4). If Yes (that individual key is flagged as locked) the controlled device can display an alert to the user that they key is locked (6c). If 4 is N (the key is not locked), the controlled device performs the key's function.

This third embodiment enables a manufacturer to provide the individual key lock out feature on their TV or other controlled device without having to provide or modify a special remote. Furthermore, it enables various remotes and aftermarket remotes to be used with the TV and still retain the lockout feature. A major advantage the third embodiment provides for locking individual keys over adding a key locking mode to the existing TV setup menu is that the procedure is greatly simplified. For example, the user need only hold down a selected key for a period of time, compared to entering a setup menu and scrolling through the myriad choices. In addition, it avoids the user inadvertently changing an important parameter while in a setup menu.

There is a long recognized need to block the functions of individual keys on modern complex remotes. The present invention discloses the first fast, easy and intuitive solution to this well known problem. Embodiments of the present invention accomplish this without requiring any changes in the design, components, or manufacture of remotes or controlled devices, and therefore, are very inexpensive and easily integrated with existing products.

This invention is clearly new and useful. Moreover, it was not obvious to those of ordinary skill in this art at the time it was made.

It will thus be seen that the objects set forth above, and those made apparent from the foregoing description, are efficiently attended. Since certain changes may be made in the foregoing construction without departing from the scope of the invention, it is intended that all matters contained in the foregoing construction or shown in the accompanying drawings shall be interpreted as illustrative and not in a limiting sense.

It is also understood that the following claims are intended to cover all of the generic and specific features of the invention herein described, and all statements of the scope of the invention which, as a matter of language, might be said to fall there between.

What is claimed is:

1. A portable remote control device that controls functions in a separate electronic device; the separate electronic device being a TV, DVR, DVD player, stereo, or cable box; by wireless transmission of signals, comprising:

an enclosure including a programmed microprocessor, a memory, a plurality of keys that are not programmed by a user wherein pressing one of the keys sends a signal to said microprocessor, a transmitter, and a source of energy, wherein when the signal is received by said microprocessor during pressing one of said keys, said microprocessor determines if the one of the keys is one of (a) an exempt key, the exempt key being one of a Power, Channel, or Volume key that is commonly-used and cannot be locked and (b) a trouble-prone key for settings, the trouble-prone key not being an exempt key and being a key that is rarely-used and can be locked; said memory is read to determine if the trouble-prone key is in a locked or an unlocked mode, and wherein if the trouble-prone key is in the unlocked mode, said microprocessor causes said transmitter to transmit a coded signal unique to the trouble-prone key, and if the trouble-prone key is in the locked mode, said microprocessor does not cause said transmitter to transmit the coded signal unique to the trouble-prone key, and further wherein said memory is changed for the trouble-prone key from the locked mode to the unlocked mode or from the unlocked mode to the locked mode when the trouble-prone key is pressed in a defined procedure wherein the defined procedure is one of (a) solely pressing the trouble-prone key for a predetermined period of time of one to four seconds and (b) pressing a lock key and then solely pressing the trouble-prone key, wherein the lock key is identified with text or an icon whereby a user is informed the lock key is used for locking or unlocking said keys; and an LED indicator lamp, wherein a light output of said LED indicator lamp when the trouble-prone key is pressed when in the locked mode is one of (a) continuous illumination and (b) intermittent illumination and wherein said LED indicator lamp is identified with text or an icon, whereby a user is informed said LED indicator lamp indicates that the trouble-prone key is locked.

2. The device of claim 1, further comprising an LCD display, wherein said LCD display displays text or an icon when the trouble-prone key is pressed when in the locked mode, whereby a user is informed that the trouble-prone key is locked.

3. The device of claim 1, wherein pressing the trouble-prone key when in the locked mode, said microprocessor causes said transmitter to transmit a lock code signal, whereby the separate electronic device displays a message or an icon informing a user that the trouble-prone key is locked.

4. The device of claim 1, wherein said microprocessor automatically sets said memory to the unlocked mode for all said trouble-prone keys when a particular sequence of said keys is pressed, whereby a user can quickly and easily unlock all trouble-prone keys.

5. The device of claim 1, wherein said microprocessor automatically sets said memory to the unlocked mode for all of said keys when one of (a) pressing the lock key for a specific range of time and (b) pressing the lock key a specific number of times is executed, whereby a user can quickly and easily unlock all keys.

6. The device of claim 1, wherein said microprocessor automatically sets said memory to the locked mode for a predetermined set of said trouble-prone keys when a particular sequence of said keys is pressed, whereby a user can quickly and easily lock the trouble-prone keys.

7. The device of claim 1, wherein said microprocessor automatically sets said memory to the locked mode for a predetermined set of said keys when one of (a) pressing the lock key for a specific range of time and (b) pressing the lock key a specific number of times is executed, whereby a user can quickly and easily lock the most trouble: prone keys.

8. The device of claim 1, further comprising a label with instructions how to set said trouble-prone keys into the locked mode and into the unlocked mode.

9. A method for locking and unlocking individual keys on a portable remote control device that controls functions in a separate electronic device; the separate electronic device being TV, DVR, DVD player, stereo, or cable box; by wireless transmission of signals, the method comprising the steps of:
providing a remote control device including a programmed microprocessor, a memory, a plurality of keys wherein pressing one of the keys sends a signal to the microprocessor, the programmed microprocessor wherein the user does not program the function of the keys, and a transmitter;
pressing one of the keys;
sending a signal to the microprocessor;
determining if the one of the keys pressed is one of (a) pressed for a predetermined length of time and (b) a lock key;
determining if the one of the keys is one of (a) an exempt key, the exempt key being one of a Power, Channel, or Volume key that is commonly-used and cannot be locked and (b) a trouble-prone key for settings, the trouble-prone key not being an exempt key and being a key that is rarely-used and can be locked;
changing said memory for the trouble-prone key from the locked mode to the unlocked mode or from the unlocked mode to the locked mode when the trouble-prone key is pressed in a defined procedure, wherein the defined procedure comprises the step of one of (a) solely pressing the trouble-prone key for a period of time in a defined range of one to four seconds and (b) pressing a lock key and then pressing solely the trouble-prone key;
reading the memory to determine if the one of the keys is in a locked mode or an unlocked mode;
blocking transmission of a coded signal unique to the one of the keys to the separate electronic device if the one of the keys is in the locked mode; and
transmitting a coded signal unique to the one of the keys to the separate electronic device if the one of the keys is in the unlocked mode.

10. The method of claim 9 further comprising the step of:
illuminating an LED indicator lamp when a trouble-prone key in the locked mode is pressed.

11. The method of claim 9 further comprising the steps of:
transmitting a locked key code to the separate electronic device when a trouble-prone key in the locked mode is pressed; and
displaying a notice on a display of the separate electronic device when a trouble-prone key in the locked mode is pressed whereby the user is alerted that the trouble-prone key is in the locked mode.

12. A method for blocking and unblocking an effect of pressing individual keys on a portable remote control device that controls functions in a separate electronic device; the separate electronic device being a TV, DVR, DVD player, cable box or stereo; by wireless transmission of signals, the method comprising the steps of:
providing a separate electronic device including a receiver, a microprocessor, and a memory;
pressing one of the keys on the portable remote control device,
transmitting a coded signal unique to the one of the keys of the portable remote control device to the receiver of the separate electronic device;
determining if the one of the keys pressed is one of (a) pressed for a predetermined length of time and (b) a lock key;
determining if the one of the keys is one of (a) an exempt key, the exempt key being one of a Power, Channel or Volume key that is commonly-used and cannot be locked and (b) a trouble-prone key for, the trouble-prone key not being an exempt key and being a key that is rarely-used and can be locked;
changing said memory in the separate electronic device for the trouble-prone key from the locked mode to the unlocked mode or from the unlocked mode to the locked mode when the trouble-prone key is pressed in a defined procedure, wherein the defined procedure comprises the step of one of (a) solely pressing the trouble-prone key for a period of time in a defined range of one to four seconds and (b) pressing a lock key and then pressing solely trouble-prone key;
reading the memory in the separate electronic device to determine if the one of the keys of the remote control device is in a locked mode or an unlocked mode;
ignoring in the separate electronic device the control unique to the one of the keys if the one of the keys is in the locked mode; and
executing a control unique to the one of the keys in the separate electronic device if the one of the keys is in the unlocked mode.

13. The method of claim 12 further comprising the step of:
displaying a notice on a display of the separate electronic device when a trouble-prone key in the locked mode is pressed whereby the user is alerted that the trouble-prone key is in the locked mode.

* * * * *